(12) United States Patent
Reddy

(10) Patent No.: US 6,980,530 B2
(45) Date of Patent: Dec. 27, 2005

(54) SPOT BEAM HOPPING PACKET SCHEDULER SYSTEM IN SATELLITE COMMUNICATION

(75) Inventor: Naveen S. Reddy, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 10/174,080

(22) Filed: Jun. 18, 2002

(65) Prior Publication Data

US 2002/0159403 A1 Oct. 31, 2002

Related U.S. Application Data

(63) Continuation-in-part of application No. 09/782,690, filed on Feb. 13, 2001.

(51) Int. Cl.[7] .............................................. H04B 7/185
(52) U.S. Cl. ....................... 370/316; 370/230; 370/412
(58) Field of Search ................................ 370/310, 459, 370/412–427, 323, 395, 443, 444, 351, 395.1, 370/395.21, 229–234, 468, 437, 395.41, 370/311–319, 321, 322, 325–348; 455/12.1, 455/13.1, 13.2, 13.3; 379/219; 345/525

(56) References Cited

U.S. PATENT DOCUMENTS

| | | | | |
|---|---|---|---|---|
| 5,016,248 A | * | 5/1991 | Kudoh ........................ | 370/413 |
| 5,736,959 A | * | 4/1998 | Patterson et al. ........... | 342/354 |
| 5,790,070 A | * | 8/1998 | Natarajan et al. .......... | 342/354 |
| 5,917,506 A | * | 6/1999 | Hsu ............................ | 345/558 |
| 5,930,254 A | * | 7/1999 | Liron et al. ............... | 370/238.1 |
| 5,940,411 A | * | 8/1999 | Takeda ....................... | 714/701 |
| 5,959,631 A | * | 9/1999 | Knittel ....................... | 345/420 |
| 6,353,618 B1 | * | 3/2002 | Hung et al. ................. | 370/459 |
| 6,377,561 B1 | * | 4/2002 | Black et al. ................ | 370/330 |
| 6,381,228 B1 | * | 4/2002 | Prieto et al. ................ | 370/323 |
| 6,522,864 B1 | * | 2/2003 | Febvre et al. .............. | 455/12.1 |
| 6,618,399 B1 | * | 9/2003 | Buckland et al. ........... | 370/516 |
| 6,628,919 B1 | * | 9/2003 | Curello et al. ............. | 455/12.1 |

* cited by examiner

*Primary Examiner*—Bob Phunkulh
*Assistant Examiner*—Ian N. Moore
(74) *Attorney, Agent, or Firm*—Artz & Artz, P.C.

(57) ABSTRACT

A spot beam hopping packet scheduler system performs efficient switching over links such as hopped spot beams which compete with each other for physical properties and resources. The spot beam hopping packet scheduler system provides statistical weighting and prioritization capabilities while accommodating resource competing links such as wireless hopped spot beams. The spot beam hopping packet scheduler system receives downlink cell ID and packet burst memory pointers from a burst assembly/congestion controller and provides packet burst information to antenna controller and modulators. The spot beam hopping packet scheduler system includes a downlink queue that is coupled to the burst assembly/congestion controller and receives the downlink cell ID and packet burst memory pointers. A cache is coupled to the downlink queue and receives and stores data from the downlink queue. A downlink search controller is coupled to the downlink queue and the cache and includes control logic operative to search the downlink queue for packet bursts, and fill any empty cache slots with appropriate data from the downlink queue. A cache search controller is coupled to the cache and includes control logic operative to search the cache in a pre-configured weighted order for compatible packet bursts based on beam angle interference, beam amplifier power and aggregate target power.

25 Claims, 4 Drawing Sheets

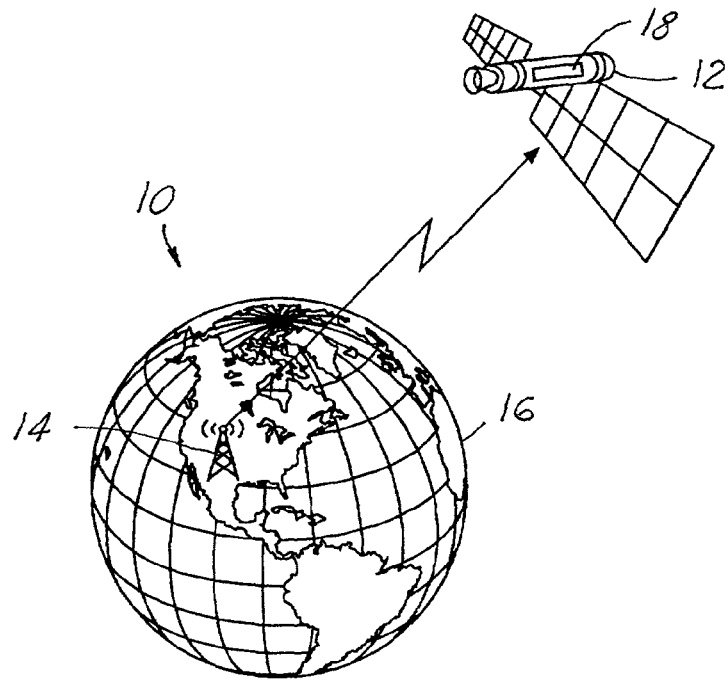

Execute the beam assignment algorithm given below for the 'N' highest power beams where 'N' is the number of beams active for a given downlink slot and polarization (as configured). The highest to lowest power beam ordering is also configured.

For the 'N' highest active beams for a given slot, and
starting form the lowest power beam within the 'N' ports,
for all unassigned ports, assign burst(i) to appropriate beam if;

Valid_Aggregate_Power_Check(i)
	and
Valid_Amp_Power_Check(i)
	and
Valid_Beam_Angle_Isolation_Check(i)
	and
Cache_Count(i) > 0

Where,

Cache_Count(i) = Number of bursts in the Cache for a given Cell ID

FIG. 5

SPOT BEAM HOPPING PACKET SCHEDULER SYSTEM IN SATELLITE COMMUNICATION

CROSS-REFERENCE TO RELATED APPLICATIONS

This is a continuation-in-part of U.S. patent application Ser. No. 09/782,690 filed on Feb. 13, 2001.

TECHNICAL FIELD

The present invention relates generally to satellite communication systems, and more particularly, to wireless spot beam hopping packet scheduler system.

BACKGROUND OF THE INVENTION

Satellites and other spacecraft are in widespread use for various purposes including scientific research and communications. These communications missions, however, cannot be accurately fulfilled without digital communications. In many applications, the satellite relies upon a form of digital communication referred to as Asynchronous Transfer Mode (ATM) to relay various information.

Asynchronous Transfer Mode (ATM) is one of the general class of digital switching technologies that relay and route traffic by means of a virtual circuit identifier (VCI) contained within the cell. Unlike common packet technologies, such as X.25 or frame relay, ATM uses very short, fixed length units of information, called cells. In applications utilizing ATM, packets at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

Prior art satellite implementations use fixed beams which are configured so that they do not interfere with each other. With this setup, ATM switching functionality can be implemented in a manner which is functionally equivalent to traditional ground based ATM implementations. However, such methods do not have the ability to handle hopped spot beams where all beams use the same frequency spectrum (frequency reuse) in a satellite that has fewer spot beams than destinations. Generally, the frequency spectrum is reused multiple times between different spot beams in order to increase the utilization of the allocated frequency spectrum. For a satellite that has fewer spot beams than destination regions (or cells), the spot beams are in turn reused (i.e., hopped) to service multiple destination regions in a Time Division Multiplexed basis. Time division multiplexing uses fixed time intervals (slots) during which each spot beam transmits a burst of packets to its respective destination. Since spot beam destinations need to be chosen dynamically for each slot based on the packets scheduled out at that time, the switch needs to be able to carefully select the packets for each beam in each slot so that none of the spot beams spatially interfere with each other in the respective slot. Also, the switch needs to provide fairness with flexibility to prioritize bandwidth offered to customers appropriate to the specific business model for the system. The said flexibility needs to be achieved on a system that uses hopped spot beams and frequency reuse. Traditional ATM methods do not accommodate switching over links which compete with each other for physical properties and resources such as frequency isolation, transponder power, and bandwidth.

Another disadvantage of traditional ATM methods is that they are not capable of handling spot beam power constraints. The power required for transmitting packets can vary between destination regions due to a number of factors such as weather and altitude. Each spot beam is limited in its power output capability such that certain beams are more capable than others. Also, there would be a limit on the total power summed across all active spot beams. Therefore, the switch has to be able to schedule packets to spot beams in a manner that none of the spot beams exceed their individual power capacities as well as not to exceed the total power output capacity of the satellite for all spot beams combined for each Time Division slot.

The disadvantage associated with these conventional asynchronous transfer mode packet scheduling techniques have made it apparent that a new technique for spot beam hopping packet scheduling is needed. The new technique should be able to efficiently handle spot beam hopping constraints which traditional ATM implementations do not handle.

SUMMARY OF THE INVENTION

It is, therefore, an object of the invention to provide a packet scheduler system which accommodates switching over links such as hopped spot beams which an compete with each other for physical properties and resources. Another objective of the invention is to provide a spot beam hopping scheduling system that achieves maximum efficiency in finding compatible packets while providing a means to achieve statistically weighted fairness in scheduling packets for destination cells.

In accordance with the objects of this invention, a spot beam hopping scheduler system is provided. In one embodiment of the invention, the spot beam hopping scheduler system receives downlink cell ID and burst memory pointers from a burst assembly and congestion controller and provides beam control information to an antenna controller and packet bursts to modulators. The spot beam hopping scheduler system includes a downlink queue that is coupled to the burst assembly and congestion controller and receives the downlink cell ID and burst memory pointer data. A cache is coupled to the downlink queue and receives and stores data from the downlink queue. A downlink queue search controller is coupled to the downlink queue and the cache and includes control logic operative to search the downlink queue for mutually compatible packet bursts, and fill any empty cache slots with appropriate data from said downlink queue. The cache search controller includes a Cell ID search order table and search range tables coupled to the time slots which provide the capability for statistical weighting in servicing each downlink Cell ID.

The present invention thus achieves an efficient spot beam hopping packet scheduler system with statistical weighting and prioritization capabilities while accommodating resource competing links such as wireless hopped spot beams. The present invention is advantageous in that it allows greater downlink/output bandwidth utilization by enabling the packet selection to be made across all destination cells having packet traffic such that a set of mutually compatible destination cells can be found. Another advantage provided by the present invention is that it provides the capability to perform weighted fair queuing in that each destination cell can be statistically weighted by means of a pre-configured search order, and multiplicity of cell ID entries. The statistical weighting is performed in addition to finding a mutually compatible set of destination cells per time slot (mutually compatible in terms of physical properties and resources). Additionally, cell ID prioritization is achieved per time slot basis where various size groups of cell IDs can have unique bandwidth allocations in multiples of time slots and/or first search priority.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 1 schematically illustrates a satellite spot beam hopping packet scheduler system in accordance with one embodiment of the present invention.;

FIG. 5 is a spot beam assignment algorithm for the spot beam hopping packet scheduler system in accordance with one embodiment of the present invention.

DESCRIPTION OF THE PREFERRED EMBODIMENT(S)

Figure 2:
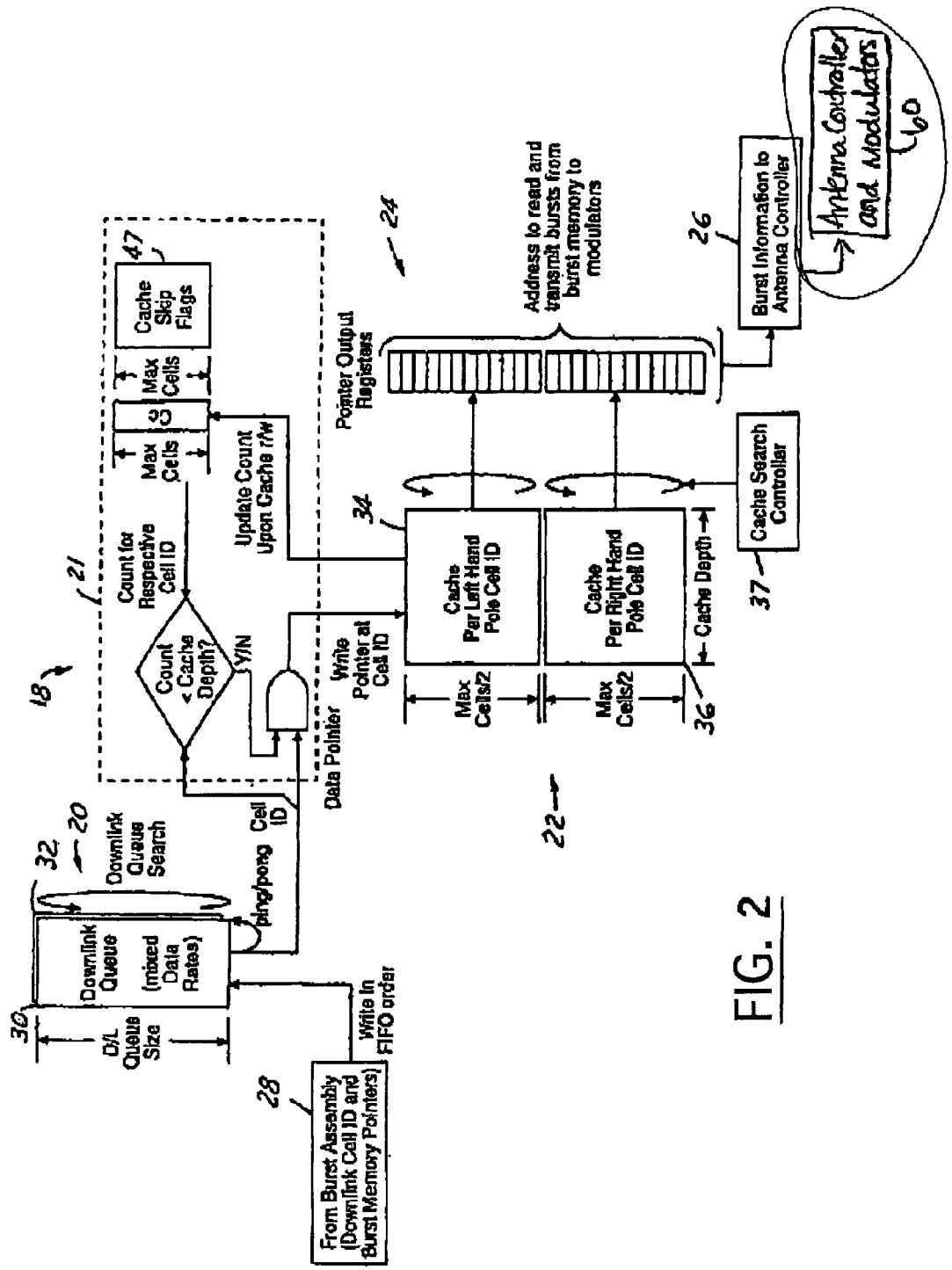
FIG. 2 is a spot beam hopping packet scheduler system in accordance with one embodiment of the present invention.

In the following figures, the same reference numerals will be used to identify identical components in the various views. The present invention is illustrated with respect to a satellite spot beam hopping packet scheduler system, particularly suited for the aerospace field. However, the present invention is applicable to various other uses that may require a statistically weighted fair queuing packet scheduler optimized for dynamically choosing mutually compatible links in a set of links competing for various resources.

Referring to FIG. 1, a perspective view of a satellite spot beam hopping packet scheduler system 10 in accordance with one embodiment of the present invention is illustrated. The satellite spot beam hopping packet scheduler system 10 is comprised of one or more satellites 12 in communication with a ground station 14 located on the Earth 16. Each satellite 12 contains one or more spot beam hopping packet scheduler systems 18 to transmit data to one or more ground stations 14.

Referring to FIG. 2, a spot beam hopping packet scheduler system 18 in accordance with one embodiment of the present invention is illustrated. The spot beam hopping packet scheduler system 18 includes a downlink queue 20, a downlink queue search controller 21, a cache 22, a cache search controller 37, and a plurality of pointer output registers 24. The plurality of pointer output registers 24 are used to supply burst information to an antenna controller 26 for setting the beam coordinates and other parameters.

The downlink queue 20 is coupled to a congestion controller and burst assembly 28 and receives Downlink Cell ID and Burst Memory Pointers written in first in, first out order to the downlink queue 20. The downlink queue 20 includes a ping side 30 and a pong side 32 that may be swapped when Cache Depth/2 time slots expire. The downlink queue 20 is coupled to the downlink queue search controller 21 and the cache 22 and provides data to the cache 22 in order to fill any appropriate empty locations in the cache 22. In the present invention, the cache 22 is divided into equal halves representing a left hand pole cell ID 34 and a right hand pole cell ID 36. The cache search controller 37 is coupled to the cache and searches the cache to find compatible packet bursts.

The contents of incoming packets are stored in main packet memory. Copies of the destination cell IDs and pointers to packet memory are managed and manipulated enough to determine the sequence order by which the main packet memory is read out for transmission through spot beams to their destination. The final stage of this "manipulation" is the scheduling.

Figure 3:
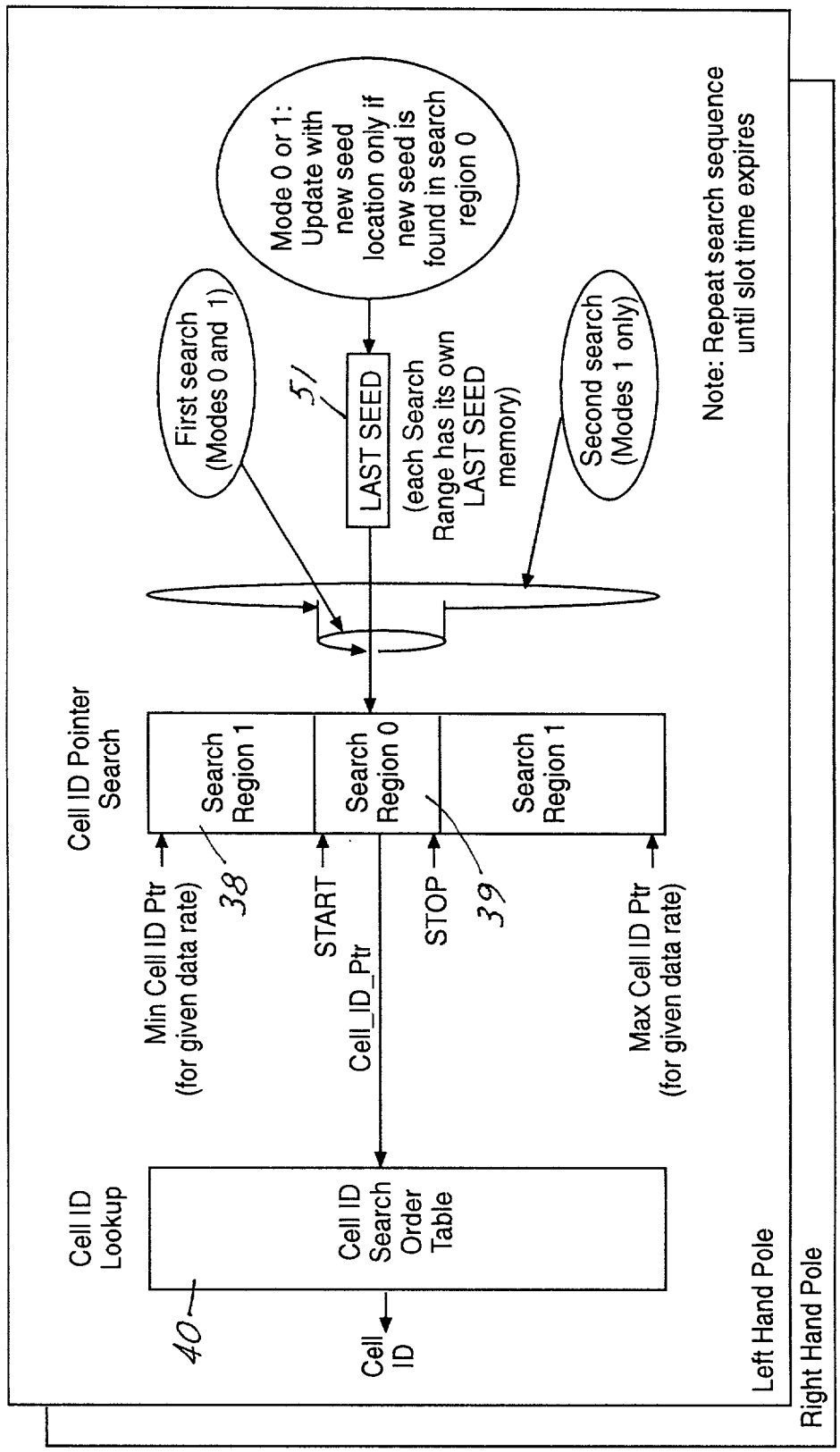
FIG. 3 is a cache cell ID search procedure overview for the spot beam hopping packet scheduler system in accordance with the embodiment of the present invention.

As packets arrive (after being assembled into bursts), they are stored in the downlink queue 20. The downlink queue 20 serves as a cost-effective buffer for the next cache stage 22. The cache 22 has a small first in, first out (FIFO) queue for each destination cell ID and requires more hardware resources to implement relative to the downlink queue 20 and, therefore, needs to be as small as possible. On the output side of the cache 22, a seed packet is selected followed by enough compatible packets to fill all parallel spot beams. New seeds are selected for each downlink time division slot time. The seeds are by default selected in a round-robin method across a pre-configured (per slot) sequential downlink cell range having traffic appropriate to the data rate and slot. However, the round-robin order is configurable to support other search orders by performing the search on a Cell ID search order table 40, as shown in FIG. 3, which contains the cell IDs in the desired order and weighting (weighting is proportional to the multiplicity of Cell ID entries in the search order table). For each time slot, the downlink queue 20 is searched to find packet bursts and fill any appropriate empty locations in the cache. It will take Cache Depth/2 time slots to search the entire downlink queue 20. The downlink queue FIFO order for each virtual connection (i.e., traffic per Cell ID) is preserved by the cache skip flags 47. The cache skip flags 47 disables the search for subsequent matches for the Cell IDs whose first match was skipped due to the respective Cache Queue being fall. The cache skip flags are cleared before the downlink queue search restarts for each iteration.

If there is a match between the Cell ID of a packet burst in the downlink queue 20 and the cell ID of a partially full or empty cache 22 FIFO queue, then that packet burst is extracted using a shuffling method and is stored in the cache 22 FIFO queue appropriate to the packet burst's cell ID. When Cache Depth/2 slots expire, the downlink queue 20 completes said search, swaps ping 30 and pong 32 sides and repeats the said search. This process ensures that the cache FIFOs stay non-empty if the downlink queue 20 has a packet burst for a desired cell ID (this process minimizes latency through the downlink queue and maximizes scheduler performance). Note that the ping 30 and pong 32 implementation of the downlink queue 20 can be optimized for the size of the downlink queue 20 memory. Instead of splitting the downlink queue 20 into two parts, ping 30 and pong 32, it can be split into more parts. The rule for determining how much to split is to use the optimum minimum size of the physical memory buffers based on the technology and implementation constraints and apply the following formula:

Number of memory Buffers=(desired downlink queue size/Buffer size)+1

The shuffling method so far has been illustrated for the simple ping/pong downlink queue 20 implementation. For a downlink queue split more than two halves, the shuffling would select a pair of adjacent buffers and label them ping and pong until one or both buffers have been completely processed. Once the pong or both buffers have been processed, the adjacent buffer(s) will be enabled and labeled as ping or pong as appropriate and processing continues on the newly selected buffer(s). When processing (searching) completes on a buffer, the search continues on the adjacent buffer until the end of the downlink queue is reached.

Figure 4:
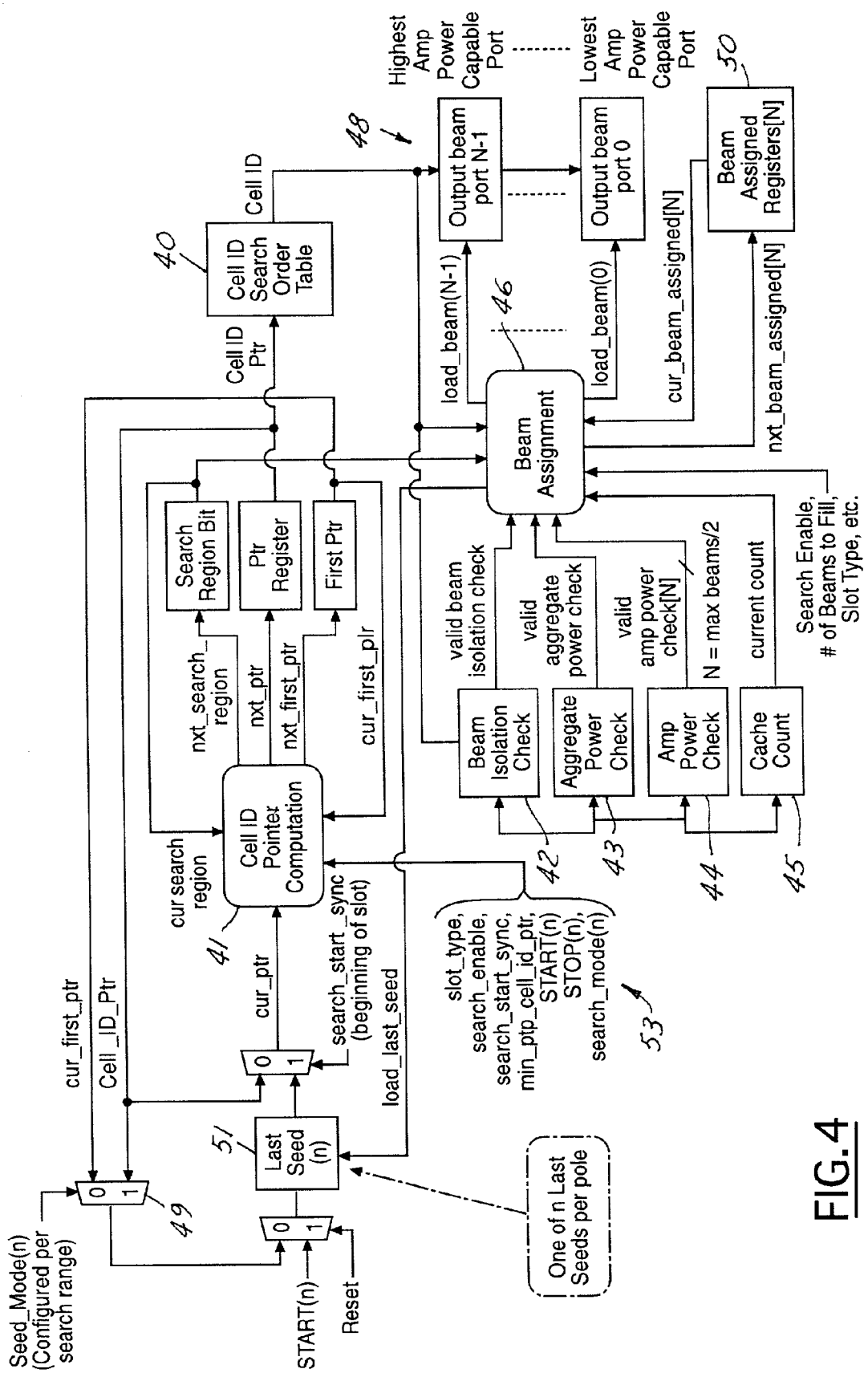
FIG. 4 is a cache search controller for the spot beam hopping packet scheduler system in accordance with one embodiment of the present invention.

In concurrence with the downlink queue searching, the cache search controller 37 searches the cache to find mutually compatible packet bursts. The Cache cell ID search procedure is illustrated in FIG. 3. The cache cell ID search procedure has two stages where one stage searches for the cell ID pointer 38, 39 and the second stage does an indirect lookup of the cell ID from the Cell ID search order table 40 memory location specified by the cell ID pointer. Furthermore, the first stage has two search regions. Search Region 0 39 is defined per time slot basis so that the respective time slot can be confined for servicing the group of Cell IDs specified in the cell ID search order table 40. Flexibility has been added by providing two search modes. Search Mode 0 confines the search to search region 0 where the search continues sequentially, in a round-robin manner until the time slot period expires or until all spot beams have been assigned 48, as shown in FIG. 4, using the beam assignment algorithm 52 as depicted in FIG. 5. Search Mode 1 allows the cell ID pointer search to perform one sequential loop in Search Region 0, followed by another sequential loop in Search Region 1. The said double loop repeats until either the time slot period expires or all spot beams have been assigned. The two search modes allow the operator to choose between prioritization of a time slot to a group of cell IDs, and providing exclusivity to a group of cell IDs. The said search modes provide prioritized service to destination cells at the time slot level.

Fairness in the seed packet burst selection is maintained by remembering the search start cell ID pointers, referred as the Last Seed 51 (FIG. 3). A unique Last Seed (n) 51 is associated with each cell ID pointer range where there are "n" pointer ranges consisting of Start(n), Stop(n), Seed Mode(n), and Search Mode(n) 53 and each parameter associated with "n", is pre-configured to zero or more time slots (FIG. 4). The "n" is proportional to the flexibility needed for the business model and represents the number of prioritization settings between time slots. The importance of remembering the last seed is that on the next time slot that uses "n", the search for the seed can start at a different cell ID pointer and give opportunity for other cell ID pointers to be selected. This concept achieves fairness since the seed packet burst (with traffic) always gets chosen since there are no other packet bursts assigned for it to be incompatible with. Since the seed packet burst always gets assigned to an available spot beam, it is important not to choose the same packet burst as a seed in consecutive time slots for "n".

The spot beam hopping packet scheduler system provides two seed search modes to achieve fairness. For seed mode 0, the cache search controller 37 starts the seed search by choosing the cell ID pointers sequentially in a round-robin method for each time slot associated with "n" regardless of whether the cell ID associated with the cell ID pointer has packet traffic or not. For seed mode 1, the cache search controller 37 starts the seed search from the next cell ID pointer that has a cell ID with packet traffic. Thus, the two seed search modes achieve fairness in different ways. The seed mode 1 achieves better performance for bursty, low packet queuing load and maintains fairness on all traffic conditions. However, seed mode 0 achieves better performance for bursty, high average packet queuing load but preserves fairness if there are no significant number of consecutive cell IDs without packet traffic. Thus, the seed modes provide flexibility to the desired balance of fairness and queuing performance.

During the cache search, as illustrated in FIG. 4 for one of the two poles for each cell ID pointer computed 41, the cell ID pointer is looked up in the cell ID search order table 40 to obtain the cell ID. Each Cell ID is used to determine whether it has packet bursts in the cache FIFO 45 and any beams area available 50. If so, determine if the cell ID is compatible with any cell IDs previously assigned to a spot beam in the same time slot. The compatibility is determined by performing a beam isolation check 42, an aggregate power check 43, and an amplifier power check 44. The beam isolation check 42 is performed on a cell IDs currently assigned to beams 50 to verify that the new cell ID is compatible with them. The aggregate power check 43 is performed to verify that the new cell ID does not require beam amplifier power which when added to the power requirements of the other previously assigned cell IDs does not exceed the total transponder power. The amplifier power check 44 is performed on all available beam amplifiers not assigned to other cell IDs to verify that at least one of them has sufficient capability to amplify the beam for the new cell ID. If all checks are positive, then the packet burst of the new cell ID under consideration will be assigned to the lowest power capable beam amplifier that meets or exceeds the power requirements of the new cell ID as shown in the spot beam assignment algorithm 52. At the end of the slot, all assigned Cell IDs will be scheduled out by de-queuing their respective packet burst and antenna control information from the cache 22 and eventually from the external packet memory and appropriate information is sent to the antenna controller and modulators 60 (See FIG. 2) to be beamed down.

The method and system of the present invention thus achieves maximum efficiency in finding compatible packets while implementing fairness between destination cells. Additionally, the present invention allows greater downlink/output bandwidth utilization by enabling the packet selection to be made across all destination cells having packet traffic. Thus, the shared queue and cache together appear as a virtual queue per destination cell ID, optimize the search for compatible packets/bursts, and add flexibility in packet/burst selection (for quality of service control).

From the foregoing, it can be seen that there has been brought to the art a new and efficient spot beam hopping packet scheduler system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A spot beam hopping packet scheduler system receiving downlink cell ID and burst memory pointers from a burst assembly and congestion controller, said spot beam hopping packet scheduler system providing burst information to an antenna controller and modulator, said spot beam hopping packet scheduler system comprising:
   a downlink queue coupled to said burst assembly and congestion controller, said downlink queue receiving and storing said downlink cell ID and burst memory pointers;
   a cache coupled to said downlink queue, said cache receiving and storing said downlink cell ID and burst memory pointers from said downlink queue;
   a downlink search controller coupled to said downlink queue and said cache, said downlink search controller having control logic operative to search said downlink queue for packet bursts and fill any empty cache slots with packet bursts from said downlink queue; and
   a cache search controller coupled to said cache, said cache search controller having control logic operative to select a seed packet from said cache in statistically weighted order, select compatible packets from said cache with statistically weighted order and assign packet bursts to spot beams.

2. The spot beam hopping packet scheduler system as recited in claim 1, further comprising a plurality of pointer output registers coupled to said cache and receiving downlink cell ID and burst memory pointers, said plurality of pointer output registers providing burst information to said antenna controller and modulators.

3. The spot beam hopping packet scheduler system as recited in claim 1, wherein said downlink queue includes a ping side and a pang side, whereby said downlink queue swaps said ping side and said pong side when Cache Depth/2 time slots expire.

4. The spot beam hopping packet scheduler system as recited in claim 1, wherein said cache includes a plurality of left hand pale Cell IDs and a plurality of right hand pole Cell IDs.

5. The spot beam hopping packet scheduler system as recited in claim 1, wherein said seed packet burst is selected in a round-robin method across a pre-configured downlink cell range, wing a starting point for a search to find said seed packet burst by searching in a pre-configured seed search mode, said seed mode consisting of Mode 1 seed and Mode 0 seed search.

6. The spot beam hopping packet scheduler system as recited in claim 1, wherein said seed packet burst is selected in a round-robin method across a pre-configured downlink cell range, using a starting point for a search to find said seed packet burst by searching in a pre-configured seed mode, said seed mode consisting of skipping mode and/or the non-skipping mode.

7. The spot beam hopping packet scheduler system as recited in claim 1, further comprising non-seed packet bursts compatible with said seed packet bursts and each other are searched in a round-robin method across a pre-configured downlink cell range, said compatibility of non-seed packet bursts determined by checking beam angle isolation, beam amplifier power, aggregate target power, and cache count.

8. The spot beam hopping packet scheduler system as recited in claim 1, wherein said downlink cell range further comprises a downlink pre-configured cell range having a pre-configured search order table of Cell IDs with ability for a multiplicity of identical cell ID entries to provide a statistically weighted fair queuing proportional to said multiplicity in order to provide advanced control over quality of service, said pre-configured downlink cell range allowing unique settings between time slots to dedicate time slots for selected geographic regions and provide quality of service which can be unique between time slots.

9. The spot beam hopping packet scheduler system as recited in claim 1, wherein said burst packet is extracted from said downlink queue using a shuffling method.

10. The spot beam hopping packet scheduler system as recited in claim 1, wherein said cache includes a plurality of memory locations, each of said memory locations having a first in, first out queue.

11. The spot beam hopping packet scheduler system as recited in claim 1, further comprising cache skip flags to skip moving subsequent packet bursts from said downlink queue to said cache if the first packet burst for respective cell ID was not moved due to a respective cache FIFO queue being full whereby said skip flags preserve a first in first out (FIFO) packet burst order for a given destination Cell ID.

12. A satellite system having an apparatus for spot beam hopping packet scheduling, said apparatus receiving downlink cell ID and burst memory pointers from a bust assembly and congestion controller, said apparatus providing burst Information to an antenna controller and modulators, said satellite system comprising:
   a ground station;
   a satellite in orbit and in communication with said ground station, said satellite having an apparatus for spot beam hopping packet scheduling comprising:
      a downlink queue located in said satellite and coupled to said burst assembly and congestion controller; said downlink queue receiving and storing said downlink cell ID and burst memory pointers;
      a cache located in said satellite and coupled to said downlink queue, said cache receiving and storing said downlink cell ID and burst memory pointers from said downlink queue;
      a downlink search controller located in said satellite and coupled to said downlink queue and said cache, said downlink queue search controller having control logic operative to search said downlink queue for packet bursts, and fill any empty cache slots with packet bursts from said downlink queue; and a cache search controller located in said satellite and coupled to said cache, said cache search controller having control logic operative to select a seed packet form said cache in statistically weighted order, select compatible packets from said cache with statistically weighted order and assign packet bursts to spot beams.

13. The satellite system as recited in claim 12, further comprising a plurality of pointer output registers coupled to said cache and receiving downlink cell ID and burst memory pointers, said plurality of pointer output registers providing burst information to said antenna controller and modulators.

14. The satellite system as recited in claim 12, wherein said downlink queue includes a ping side and a pong side, whereby said downlink queue swaps said ping side and said pong side when Cache Depth/2 time slots expire.

15. The satellite system as recited in claim 12, wherein said cache includes a plurality of left hand pole Cell Ids and a plurality of right hand pole Cell Ids.

16. The satellite system as recited in claim 12, wherein said seed packet burst is selected in a round-robin method across a pre-configured downlink cell range, a starting point of the search to find the seed packet burst is determined by searching in a pre-configured seed search mode where Cell IDs in said Cache are skipped if a Cache FIFO queue for that cell ID is empty.

17. The satellite system as recited in claim 12, wherein said seed packet burst is selected in a round-robin method across a pre-configured downlink cell range, a starting point of the search to find the seed packet burst is determined by searching in a pre-configured seed mode where Cell IDs in said Cache are selected in a round-robin manner over a pre-configured Cell ID order regardless of whether a Cache FIFO for the corresponding Cell ID is empty or not.

18. The satellite system as recited in claim 12, further comprising non-seed packet bursts compatible with the seed packet bursts and each other and being searched in a round-robin method across a pre-configured downlink cell range, said compatibility of non-seed packet bursts is determined by checking beam angle isolation, beam amplifier power, aggregate target power, and cache count.

19. The satellite system as recited in claim 12, further comprising a downlink cell range having a pre-configured search order table of Cell IDs with ability for a multiplicity of identical cell ID entries to provide a statistically weighted fair queuing proportional to said multiplicity in order to provide advanced control over quality of service, the pre-configured downlink cell range providing unique settings between time slots to dedicate time slots for selected geographic regions and provide quality of service which can be unique between time slots.

20. The satellite system as recited in claim 12, wherein said burst packet is extracted from said downlink queue using a shuffling method.

21. The satellite system as recited in claim 12, wherein said cache includes a plurality of memory locations, each of said memory locations having a first in, first out queue.

22. The satellite system as recited in claim 12, further comprising cache skip flags to skip moving subsequent packet bursts from said downlink queue to said cache if the first packet burst for respective cell ID was not moved due to a respective cache FIFO queue being full, said skip flags preserve a first in first out (FIFO) packet burst order for a given destination cell ID.

23. A method of spot beam hopping packet scheduling comprising the steps of:

receiving downlink cell ID and burst memory pointers;

storing said downlink cell ID and burst memory pointers in a downlink queue;

transferring said downlink cell ID and burst memory pointers to a cache;

preserving FIFO order for all bursts for a given Cell ID;

selecting starting point for seed packet burst search in said cache;

searching said cache for seed packet burst in pre-configured search order, search range and statistical weighting;

searching said cache for compatible packet bursts in pre-configured search order, search range and statistical weighting;

searching said downlink queue for packet bursts; and filling any empty cache memory with packet bursts from said downlink queue;

transferring said downlink cell ID and burst memory pointers stored in said cache to a plurality of pointer output registers; and providing packet burst information to an antenna controller and packet burst content to a plurality of modulators for setting spot beam coordinates.

24. The method of spot beam hopping packet scheduling as recited in claim 23, further comprising the step completing and restarting the downlink queue search when Cache Depth/2 time slots expire.

25. The satellite system as recited in claim 14 further comprising a plurality of ping and pong buffers wherein an optimum number of ping and pong buffers equal to one more than the result of the number of a desired downlink queue size divided by a desired physical buffer size.

* * * * *